US000001334H

United States Statutory Invention Registration [19]

[11] Reg. Number: H1334

Plichta et al.

[43] Published: Jul. 5, 1994

[54] METHOD OF MAKING A TEFLON BONDED CATHODE FOR USE IN A HIGH TEMPERATURE CELL AND HIGH TEMPERATURE CELL INCLUDING SAID CATHODE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 715,083

[22] Filed: Jun. 10, 1991

[51] Int. Cl.[5] ..... H01M 4/48; H01M 4/62; H01M 6/20

[52] U.S. Cl. ..... 429/103; 429/217; 429/221

[58] Field of Search ..... 429/103, 217, 221

[56] References Cited

U.S. PATENT DOCUMENTS

| | | | |
|---|---|---|---|
| 3,009,980 | 11/1961 | Corren et al. | 429/217 |
| 3,907,589 | 9/1975 | Gay et al. | 429/103 |
| 4,189,529 | 2/1980 | Birt et al. | 429/103 |
| 4,233,378 | 11/1980 | Joo et al. | 429/103 |
| 4,592,969 | 6/1986 | Coetzer et al. | 429/103 |
| 4,601,919 | 7/1986 | Asami et al. | 429/217 |
| 4,797,333 | 1/1989 | Coetzer et al. | 429/103 |
| 5,035,963 | 7/1991 | Plichta et al. | 429/103 |
| 5,143,805 | 9/1992 | Anderman et al. | 429/217 |
| 5,168,020 | 12/1992 | Jow | 429/217 |

FOREIGN PATENT DOCUMENTS

| | | | |
|---|---|---|---|
| 76753 | 5/1982 | Japan | 429/217 |
| 40770 | 3/1983 | Japan | 429/217 |
| 40773 | 3/1983 | Japan | 429/217 |
| 2023917 | 1/1980 | United Kingdom | 429/103 |

OTHER PUBLICATIONS

*Encyclopedia of Polymer Science and Engineering*, vol. 16, pp. 624, 625, (1989), John Wiley & Sons, Inc.

*Primary Examiner*—Shean Wu

*Attorney, Agent, or Firm*—Michael Zelenka; Roy E. Gordon

[57] ABSTRACT

A method is provided for preparing flexible, free standing electrodes for use in preparing transition metal sulfide cathodes for use in high temperature electrochemical cells. Specifically, the cells contain sodium as the anode, a solid electrolyte separator of $\beta''$-$Al_2O_3$, and a Teflon bonded iron (IV) sulfide cathode emmersed in a molten salt electrolyte of $NaAlCl_4$ and electrochemically operated at 200° C.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MAKING A TEFLON BONDED CATHODE FOR USE IN A HIGH TEMPERATURE CELL AND HIGH TEMPERATURE CELL INCLUDING SAID CATHODE

GOVERNMENT INTEREST

The invention described herein may be manufactured, used, and licensed by or for the Government for governmental purposes without the payment to us of any royalty thereon.

FIELD OF INVENTION

This invention relates in general to a method of preparing a teflon bonded cathode, and in particular to a high temperature electrochemical cell including the cathode, the cell containing sodium as the anode, a solid electrolyte separator of $\beta''$-$Al_2O_3$, and a teflon bonded iron (IV) sulfide cathode emmersed in a molten salt electrolyte of $NaAlCl_4$ and electrochemically operated at 200° C.

BACKGROUND OF THE INVENTION

It has been desired in the art to provide a method for preparing flexible free standing electrodes for use in preparing transition metal sulfide cathodes for use in high temperature electrochemical cells; particularly cells of the type Na/$\beta''$-$Al_2O_3$/$NaAlCl_4$-transition metal sulfide electrochemical cell at 200° C. Previous cathodes used for other Na/$\beta''$-$Al_2O_3$/$NaAlCl_4$-transition metal sulfide cells used a slurry mixture of the transition metal sulfide and electrolyte formed onto a graphite felt that was then contained in a separated compartment from the sodium anode. The disadvantage of this cell preparation was that large amounts of graphite felt of greater than 20 weight percent were needed in the cathode to provide sufficient electrical contact to the transition metal sulfide active material. In addition, this type of cathode process didn't immobilize the active cathode materials and thus after the electrolyte was molten, the active materials settled in the cell resulting in an nonuniform distribution of the electrochemical products.

SUMMARY OF THE INVENTION

The general object of this invention is to provide a cathode for use in a high temperature electrochemical cell wherein the cathode is free standing and impervious to attack by the electrolyte at the cell's operating temperature of 200° C. A further object of the invention is to provide such a cathode where only the weight percent of graphite is needed in the cathode to aid in reducing cell polarization while providing excellent cell performance at discharge rates up to 200 mA/cm$^2$. A still further object of the invention is to provide a method of making a cathode that will provide excellent electrochemical cell performance of the Na/Na-$\beta''$-$Al_2O_3$/-$NaAlCl_4$-$FeS_2$ cell when operated at 200° C.

It has now been found that the aforementioned objects can be attained by preparing thermally sintered cathodes made from powdered mixtures of transition metal sulfides, a conductive diluant, and teflon aqueous emulsion onto a metal grid, plate or sheet.

The cathode electrodes are prepared using 80 to 90 weight percent powdered transition metal sulfide active materials such as $FeS_2$, $NiS_2$, $CoS_2$, FeS, NiS, and CoS mixed with 5 to 10 weight percent conductive diluents such as graphite, carbon, and metal powders or fibers with 5 to 10 weight percent Teflon solids from a Teflon-aqueous emulsion. Into the aforementioned cathode mixture is added a distilled water-isopropylalcohol solution (60/40 wt %) in drop wise additions until a tough dough like consistency is attained. The cathode dough is then successively roll pressed between two Mylar plastic sheets to a thickness of about three quarters of a millimeter. The cathode sheet is then cut into two equally sized pieces and a metal current collector grid placed in between them. The cathode with the grid is then roll pressed between the Mylar sheets to a thickness of about one millimeter. The rolled cathode is then placed between two polished aluminum plates, which keep the cathode flat and avoids curling during sintering, and sintered at 280° C. for one hour in an evacuated oven. The Teflon sintered cathodes are cooled under vacuum to ambient temperature before being transferred into an argon filled glove box.

DESCRIPTION OF THE PREFERRED EMBODIMENT

A specific cathode preparation utilizes 80 weight percent iron (IV) sulfide (−325 mesh powder) as the active cathode component, 10 weight percent graphite powder as the conductive diluent, and 10 weight percent Teflon as the cathode binder sintered onto an expanded stainless steel grid at 280° C. for one hour under vacuum.

This cathode is prepared into a high temperature electrochemical cell consisting of 2.5 grams of liquid sodium contained in a Ceramatec $\beta''$-$Al_2O_3$ sealed end solid electrolyte tube having dimensions of 0.9 cm inside diameter, 10 cm length, and 0.083 cm thickness emmersed in a 2.54 cm diameter stainless steel can having a length of 4.86 cm and thickness of 0.05 cm containing 6.5 grams of $NaAlCl_4$ molten salt electrolyte (mp=150° C.) into which is emmersed the Teflon bonded $FeS_2$ cathode. A stainless steel rod provided electrical contact with the molten sodium metal and electrical contact to the cathode is provided by spot welding a portion of the cathode grid to the stainless can. The assembled cell is then sealed into an 8 cm inside diameter sealed bottom Pyrex glass vessel equipped with a threaded Teflon cap having electrical feed throughs and inert gas inlet and outlet fittings. Electrical connections are made between the cell and the feed throughs of the Teflon cap and argon gas is continuously purged through the cell during the galvanostatic cycling performed at 200° C.

We wish it to be understood that we do not desire to be limited to the exact details of construction as described for obvious modifications will occur to a person skilled in the art.

What is claimed is:

1. A high temperature electrochemical cell including sodium as the anode, a solid electrolyte separator of B''-$Al_2O_3$', and a Teflon bonded iron (iv) sulfide cathode emersed in a molten salt electrolyte of $NaAlCl_4$ and capable of being electrochemically operated at 200° C., wherein the teflon bonded cathode is obtained by a method including the steps of:

(A) forming a mixture of about 80 weight percent $FeS_2$ as the active cathode component, about 10 weight percent graphite as the conductive diluent, and about 10 weight percent Teflon as the cathode binder, (B) drop wise adding a wetting agent of distilled water-isopropylalcohol (60/40 weight percent) solution to the mixture to form a stiff dough, (C) roll pressing the dough onto a expanded metal grid current collector and sintering at about 280° C. for about one hour under vacuum, and (D) cooling under vacuum to ambient temperature.

* * * * *